Aug. 29, 1933.  K. MAYBACH  1,924,128
CHANGE SPEED GEAR
Filed March 26, 1931  2 Sheets-Sheet 1

Inventor:
Karl Maybach

Aug. 29, 1933.  K. MAYBACH  1,924,128
CHANGE SPEED GEAR
Filed March 26, 1931  2 Sheets-Sheet 2

Inventor:
Karl Maybach

Patented Aug. 29, 1933

1,924,128

UNITED STATES PATENT OFFICE 1,924,128

CHANGE SPEED GEAR

Karl Maybach, Friedrichshafen, Bodensee, Germany, assignor to Maybach-Motorenbau G. m. b. H., Friedrichshafen, Bodensee, Germany Application March 26, 1931, Serial No. 525,400, and in Germany April 3, 1930

2 Claims. (Cl. 74—59)

My invention relates to change speed gears and has special reference to gears of this kind as used in automobiles and the like.

The main object of my invention is a very compact and comparatively small gear case in combination with an easy and comfortable manner of changing the speeds without being obliged to touch the main friction clutch between motor and gear case and without taking a hand away from the steering wheel.

For this purpose I make use of a new combination four speed change speed gear which is developed from my two speed gear as disclosed in my U. S. Patent Re. 17,707 and for which I provide two operating levers on the steering wheel each of which has but two positions, preferably in a certain relation to each other.

Figure 1:
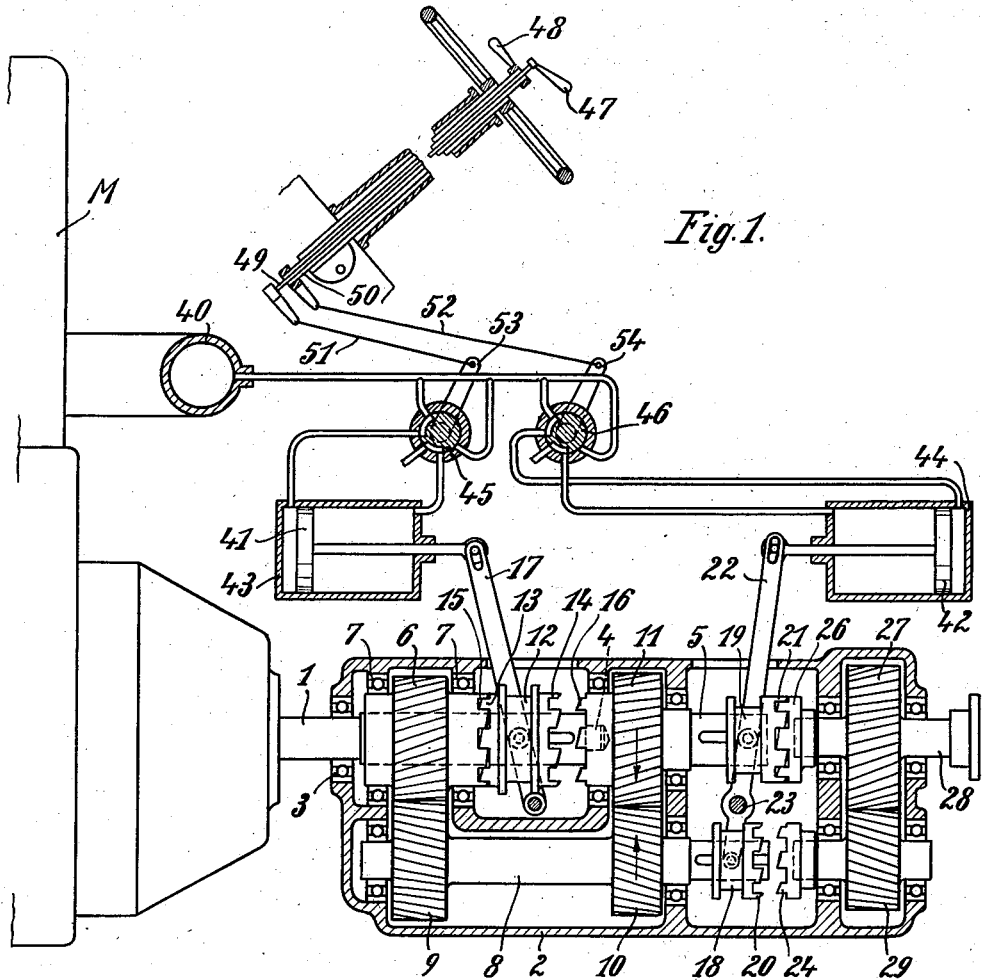
Figure 2:
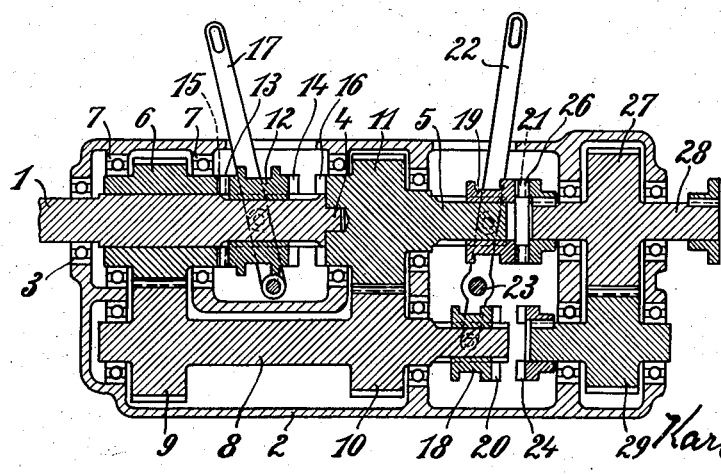

The invention will be understood best when having reference to the drawings. Fig. 1 is a diagrammatic longitudinal vertical section through the case of a change speed gear with its auxiliary members, whereas Fig. 2 is a corresponding section through the gears and shafts of the same change speed gear. Figs. 3, 4, 5 and 6 are mere diagrams.

The motor driven incoming shaft 1 is loosely surrounded by gear 6; and splined to shaft 1 is sleeve 12. This sleeve at its left hand end is provided with claw coupling teeth 13 adapted to cooperate with corresponding coupling teeth 15 on gear 6. At its right hand end sleeve 12 has another claw coupling half 14 adapted to engage with coupling half 16 on gear 11. Gear 6 meshes with gear 9 which is fixed to countershaft 8 and gear 11 meshes with gear 10 also fixed to shaft 8. Sleeve 18 having a claw coupling half 20 at its right hand end is splined to shaft 8, and by means of double-armed lever 22 fulcrumed at 23 it is made to cooperate with sleeve 19 splined to stub shaft 5 which is in rigid connection with gear 11. The right hand end of sleeve 19 is provided with claw coupling half 21 adapted to engage with claw coupling half 26 on outgoing shaft 28. Coupling half 20 of sleeve 18 is adapted to engage with coupling half 24 which is in rigid connection with gear 29. There is a gear 27 rigidly connected to shaft 28 and meshing with gear 29.

The operation of lever 17 acting on sleeve 12 and of lever 22 acting on sleeves 18 and 19 is caused by means of vacuum created for example by the intake of the motor M. This vacuum acts on pistons 41 and/or 42, respectively, which slide in cylinders 43 and 44, respectively. Operating cocks 45 and 46, or other suitable elements, inserted in the vacuum lines serve for controlling the vacuum. They themselves are operated by means of two small levers 47 and 48, both symmetrically mounted on the steering wheel of the automobile. Shafts 49 and 50, situated within the steering column, in connection with rods 51 and 52 transmit the movement of levers 47 and 48, respectively, to levers 53 and 54 of the cocks 45 and 46, respectively.

Levers 47 and 48 each have only two positions, as may be seen from Figs. 3 to 6, inclusive. One position of lever 47 corresponds to the left hand position of piston 41, and its other position corresponds to the right hand position of the same piston. The vacuum control member 45 in one case connects the vacuum source 40 with the left hand side of cylinder 43 and in the other case with the right hand side thereof. In both cases the respective opposite cylinder sides are connected with the atmosphere. With lever 48, piston 42 and cylinder 44 the conditions are perfectly equal to those just explained with regard to lever 47, piston 41 and cylinder 43.

The operation of levers 17 and 22 may of course be effected by means of any other mechanism as well; for example hand or foot operation may be provided. Or instead of using vacuum the operating medium may for example be compressed air or some suitable liquid. But means should be provided that the levers 17 and 22 each are always tensioned towards one of their respective end positions and are not allowed an intermediate idling position, for example by means of a spring or the like.

With regard to sleeves 12, 18 and 19 one feature is of special importance, that is that the front faces of the teeth of the claw couplings are bevelled in a certain direction. This direction is so that when changing from one position into the other one the claw couplings coming into contact repulse each other until their relative sense of revolution has changed, or with other words, final engagement of the coupling halves which are tensioned towards each other is so long prevented by the bevelled front faces of the teeth until the originally faster running coupling half becomes the slower one or vice versa.

These conditions prevail with sleeve 12 and its two claw couplings 13/15 and 14/16 which are operative alternately and also with sleeves 18 and 19 which are to be considered as a combined element which operates in the same manner with regard to claw couplings 20/24 and 21/26, also alternately operative.

The speed changes are perfected simply by setting lever 47 or lever 48, or both of them in the position or positions wanted, to take the gas off the motor in the moment the speed change is desired and shortly afterwards to give gas again. Setting the levers at the steering wheel causes one of the control members, or both of them, to change the connection of the vacuum source to the sides of the cylinders 43 and/or 44, respectively. As soon as gas is taken off the motor the claw coupling or the claw couplings concerned disengage under the suction from the vacuum (instead of using the motor intake as vacuum source any other vacuum container will do as well). But because of the bevelled front faces of the claw teeth the other claw coupling, or couplings, do not engage but its or their halves rattle past each other until a change in their relative sense of rotation has occurred which may be caused merely by the motor losing in speed of rotation more rapidly than the automobile or by increasing the motor revolutions so as to catch up with the on-rolling car having the greater momentum, as circumstances may afford because of a change being made from a higher to a lower speed or from a lower to a higher speed.

This working of such double claw couplings with bevelled faces is explained in detail in my main U. S. Patent Nr. Re. 17,707.

Figure 3:
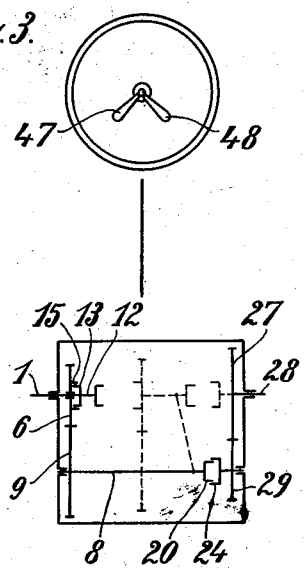
Figure 4:
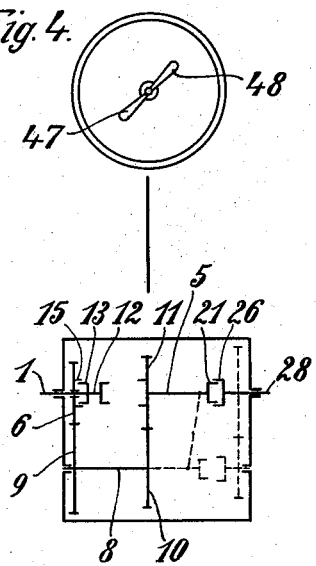
Figure 5:
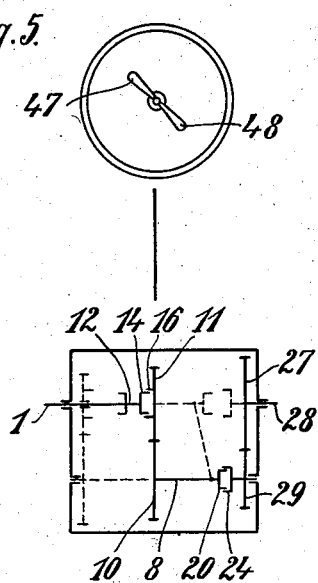
Figure 6:
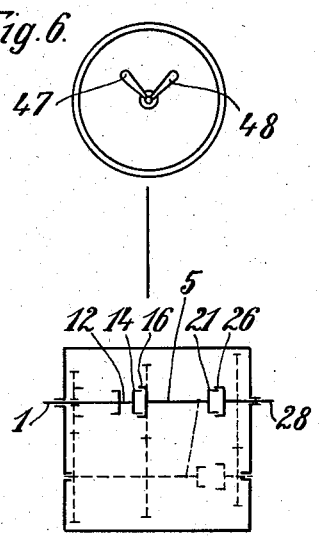

The different positions of the levers on the steering wheel and the corresponding connections within the gear box are represented in Figs. 3 to 6, respectively. According to the invention levers 47 and 48 are so arranged that each of them has only two positions, as mentioned before. It is preferred to have these positions so chosen that the levers are situated substantially symmetrical to the vertical diameter of the steering wheel. Besides practice has proved advantageous to have the lowest speed in connection with both levers being set in the directions pointing more or less towards the driver, as represented in Fig. 3, whereas as Fig. 6 shows the positions of the levers pointing away from the driver which positions correspond to the highest speed being set.

In the diagrams of Figs. 3 to 6, inclusive, only to the force transmitting elements shown in strong lines the corresponding numerals are given, whereas the members idling in the individual case are indicated in dotted lines only.

The lowest or first speed is set when couplings 13/15 and 20/24 engage, as represented in Fig. 3. Movement of lever 22 so as to disengage coupling 20/24 and at the same time to engage coupling 21/26 causes the second speed (Fig. 4). Shifting sleeve 12 from its left hand position into its right hand position and at the same time moving back lever 22 into its original position brings into engagement couplings 14/16 and 20/24 thus setting the third speed (Fig. 5). And the fourth or direct speed is attained by again moving lever 22 so as to disconnect coupling 20/24 and to connect coupling 21/26 (Fig. 6). These are the progressive speed changes. But it is possible with my new gear to change also from any one of the four speeds into any other one thereof without touching the main friction clutch simply by putting the levers 47 and 48 into adequate positions, taking the gas off the motor and giving gas again.

I do not want to be limited to the details described or shown in the drawings, as many variations will occur to those skilled in the art.

What I claim is:

1. A change speed gear comprising; a main gear shaft having three portions, a gear on each of said portions; a countershaft having two portions, two gears on the first one of said portions and one gear on the second portion; every gear on said main shaft being in constant mesh with one of the gears on said countershaft; means for alternately connecting the first main shaft portion to the gear thereon or to the second main shaft portion; means for connecting said second main shaft portion to said third main shaft portion; and means for connecting said first countershaft portion to said second countershaft portion; said latter two means being adapted to operate alternately.

2. A change speed gear comprising; a main gear shaft having three portions, a gear on each of said portions; a countershaft having two portions, and two gears on the first one of said portions and one gear on the second portion; every gear on said main shaft being in constant mesh with one of the gears on said countershaft; a sleeve slidably splined to said first main shaft portion, said sleeve having a coupling half on each of its ends; said gear on said first main shaft portion having a coupling half adapted to co-operate with said coupling half on one end of said sleeve; said gear on said second main shaft portion being rigidly fixed thereto and having a coupling half adapted to co-operate with said coupling half on the other end of said sleeve; a sleeve slidably splined to said second main shaft portion and having a coupling half on one of its ends; said third main shaft portion having a coupling half adapted to co-operate with said coupling half on said second main shaft portion; a sleeve slidably splined to one of said countershaft portions and having a coupling half on one of its ends; the other one of said countershaft portions having a coupling half adapted to co-operate with said coupling half on the sleeve on said first countershaft portion; connecting means between said second and said third sleeves; all said coupling halves being provided with teeth having front faces so inclined that the co-operating halves on approaching each other do not engage but rattle past each other so long until the originally faster rotating half becomes the slower rotating one and vice versa.

KARL MAYBACH.